(12) United States Patent  (10) Patent No.: US 8,595,840 B1
Malibiran et al.  (45) Date of Patent: Nov. 26, 2013

(54) DETECTION OF COMPUTER NETWORK DATA STREAMS FROM A MALWARE AND ITS VARIANTS

(75) Inventors: Ed Israel Santos Malibiran, Arcadia, CA (US); Ronald Castro Bautista, Arcadia, CA (US); James Thomas Bennett, Jr., Azusa, CA (US)

(73) Assignee: Trend Micro Incorporated, Tokyo (JP)

( * ) Notice: Subject to any disclaimer, the term of this patent is extended or adjusted under 35 U.S.C. 154(b) by 182 days.

(21) Appl. No.: 13/114,881

(22) Filed: May 24, 2011

Related U.S. Application Data

(60) Provisional application No. 61/350,373, filed on Jun. 1, 2010.

(51) Int. Cl.
*G06F 11/00* (2006.01)
*G06F 12/14* (2006.01)
*G06F 7/04* (2006.01)
*G06F 17/30* (2006.01)

(52) U.S. Cl.
USPC ........... 726/24; 726/22; 726/23; 726/25; 726/26

(58) Field of Classification Search
None
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,907,834 A | 5/1999 | Kephart et al. | |
| 6,192,512 B1 | 2/2001 | Chess | |
| 6,279,128 B1 | 8/2001 | Arnold et al. | |
| 6,622,134 B1 | 9/2003 | Sorkin | |
| 6,711,583 B2 | 3/2004 | Chess et al. | |
| 6,772,345 B1 | 8/2004 | Shetty | |
| 6,789,200 B1 | 9/2004 | Fiveash et al. | |
| 6,813,712 B1 | 11/2004 | Luke | |
| 7,069,437 B2 | 6/2006 | Williams | |
| 7,080,408 B1 | 7/2006 | Pak et al. | |
| 7,093,121 B2 | 8/2006 | Barton et al. | |
| 7,257,564 B2 | 8/2007 | Loughmiller et al. | |
| 7,287,281 B1 | 10/2007 | Szor | |
| 7,302,706 B1 | 11/2007 | Hicks et al. | |
| 7,392,534 B2 | 6/2008 | Lu | |
| 7,472,418 B1 | 12/2008 | McCorkendale et al. | |
| 7,500,096 B2 | 3/2009 | Lang et al. | |
| 7,571,485 B1 * | 8/2009 | McCorkendale et al. | 726/26 |

(Continued)

FOREIGN PATENT DOCUMENTS

EP    1 377 892 B1    9/2004
WO    WO 02/084459 A1    10/2002

OTHER PUBLICATIONS

List of HTTP headers—Wikipedia, the free encyclopedia, 6 sheets [retrieved on May 29, 2011], retrieved from the internet: http://en.wikipedia.org/wiki/List_of_HTTP_headers.

*Primary Examiner* — Nathan Flynn
*Assistant Examiner* — Trang Doan
(74) *Attorney, Agent, or Firm* — Okamoto & Benedicto LLP

(57) ABSTRACT

Computer network data streams generated by a Trojan program and its variants are detected by receiving a relevance pattern in a client computer. An antivirus in the client computer detects a computer network data stream from the Trojan program communicating with an associated malicious server computer. The antivirus checks the computer network data stream for network characteristics of the Trojan program and one or more of its variants indicated in the relevance pattern. The network characteristics may include the order that HTTP headers and/or commands appear in network communications from the Trojan program and its variants.

20 Claims, 7 Drawing Sheets

(56) References Cited

U.S. PATENT DOCUMENTS

| | | |
|---|---|---|
| 7,752,664 B1 * | 7/2010 | Satish et al. ............... 726/22 |
| 2001/0033657 A1 | 10/2001 | Lipton et al. |
| 2002/0010800 A1 | 1/2002 | Riley et al. |
| 2003/0037138 A1 | 2/2003 | Brown et al. |
| 2003/0145228 A1 | 7/2003 | Suuronen et al. |
| 2004/0006715 A1 | 1/2004 | Skrepetos |
| 2004/0034794 A1 | 2/2004 | Mayer et al. |
| 2004/0054742 A1 | 3/2004 | Gruper et al. |
| 2004/0064736 A1 | 4/2004 | Obrecht et al. |
| 2004/0073634 A1 | 4/2004 | Haghpassand |
| 2004/0268149 A1 | 12/2004 | Aaron |
| 2005/0015599 A1 | 1/2005 | Wang et al. |
| 2005/0021740 A1 | 1/2005 | Bar et al. |
| 2005/0157662 A1 * | 7/2005 | Bingham et al. ............ 370/254 |
| 2005/0175183 A1 * | 8/2005 | Ovadia et al. ............... 380/278 |
| 2005/0223001 A1 | 10/2005 | Kester et al. |
| 2006/0123481 A1 * | 6/2006 | Bhatnagar et al. ............ 726/24 |
| 2006/0212572 A1 | 9/2006 | Afek et al. |
| 2007/0147382 A1 * | 6/2007 | Kim et al. .................... 370/392 |
| 2008/0052779 A1 * | 2/2008 | Sinha et al. .................. 726/22 |
| 2008/0196099 A1 | 8/2008 | Shastri |
| 2008/0295173 A1 * | 11/2008 | Tsvetanov .................... 726/23 |
| 2008/0301305 A1 * | 12/2008 | Huang ......................... 709/228 |
| 2009/0025077 A1 * | 1/2009 | Trojanowski ................. 726/11 |
| 2009/0144823 A1 * | 6/2009 | Lamastra et al. ............. 726/22 |
| 2010/0107228 A1 * | 4/2010 | Lin ................................ 726/5 |
| 2010/0263046 A1 * | 10/2010 | Polavarapu ................... 726/22 |
| 2011/0023121 A1 * | 1/2011 | Fossen et al. ................. 726/24 |

* cited by examiner

DETECTION OF COMPUTER NETWORK DATA STREAMS FROM A MALWARE AND ITS VARIANTS

CROSS-REFERENCE TO RELATED APPLICATION

This application claims the benefit of U.S. Provisional Application No. 61/350,373, filed on Jun. 1, 2010, which is incorporated herein by reference in its entirety.

BACKGROUND OF THE INVENTION

1. Field of the Invention

The present invention relates generally to computer security, and more particularly but not exclusively to methods and apparatus for detecting malware in computer network data streams.

2. Description of the Background Art

Computer viruses, worms, Trojans, rootkits, and spyware are examples of malware that have plagued computer systems throughout the world. Although there are technical differences between different forms of malware, technology for detecting malware is also generally referred to as "antivirus."

A Trojan is a computer program that creates a back door or hole in a computer system. Unlike a computer virus, a Trojan does not usually infect or attach itself to a file. However, a Trojan is as destructive because it allows unauthorized access to a victim computer, including monitoring the victim computer for confidential information that the Trojan sends back to its originator or other cyber criminals. Once installed in the victim computer, a Trojan may also download other programs from a malicious server.

Some Trojans use technology that makes them very difficult to detect in the victim computer. To prevent the Trojan from contacting a malicious server computer, some antivirus employ a blacklist of URL (Uniform Resource Locator), URI (Uniform Resource Identifier), IP (Internet Protocol) address, user-agent, filename, and other identifiers associated with known malicious servers. The blacklist may be employed in conjunction with a reputation service to determine if a computer is communicating with a known malicious server. If so, the antivirus blocks the communication so that the Trojan cannot "phone home." A blacklist, however, is highly inefficient and difficult to maintain because identifiers of a malicious server are easily changed and the number of malicious servers continue to increase.

SUMMARY

In one embodiment, a method of detecting computer network data streams generated by a malware includes receiving a relevance pattern in a client computer, the relevance pattern indicating computer network traffic characteristics of a Trojan program and one or more variants of the Trojan program. A computer network data stream is detected in the client computer. It is determined whether the computer network data stream matches computer network traffic characteristics of the Trojan program or the one or more of variants of the Trojan program indicated in the relevance pattern. The Trojan program is prevented from communicating with the malicious server computer when the computer network data stream matches the network traffic characteristics of the Trojan program or the one or more variants of the Trojan program indicated in the relevance pattern.

In another embodiment, a method of detecting computer network data streams generated by a malware comprises receiving a single relevance pattern in a client computer, the single relevance pattern indicating computer network traffic characteristics of a Trojan program and one or more variants of the Trojan program. A TCP (transport control protocol) stream from a Trojan program running in the client computer is detected, the TCP stream being sent by the Trojan program to a corresponding malicious server computer configured to receive confidential information stolen by the Trojan program in the client computer, the TCP stream being detected as being generated by the Trojan program based on an order that HTTP (Hypertext Transfer Protocol) commands and headers appear in the TCP stream.

In another embodiment, a method of detecting computer network data streams generated by a malware comprises receiving a relevance pattern in a client computer, the relevance pattern indicating computer network traffic characteristics of a Trojan program and one or more variants of the Trojan program, the Trojan program and the one or more variants of the Trojan program having different malicious server URL (uniform resource locator) and different binary data. A TCP (transport control protocol) stream generated by a variant of the Trojan program is detected based on an order HTTP (hypertext transport protocol) commands appear in the TCP stream. The Trojan program is prevented from communicating with the malicious server computer in response to detecting the TCP stream generated by the variant of the Trojan program.

These and other features of the present invention will be readily apparent to persons of ordinary skill in the art upon reading the entirety of this disclosure, which includes the accompanying drawings and claims.

DESCRIPTION OF THE DRAWINGS

FIGS. 3-6 schematically illustrate generation of a relevance pattern in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored non-transitory in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. As can be appreciated, software components are executed by a processor to perform computational and other data processing steps. Software components may be implemented in logic circuits, for example. Components may be implemented separately in multiple modules or together in a single module.

Figure 1:
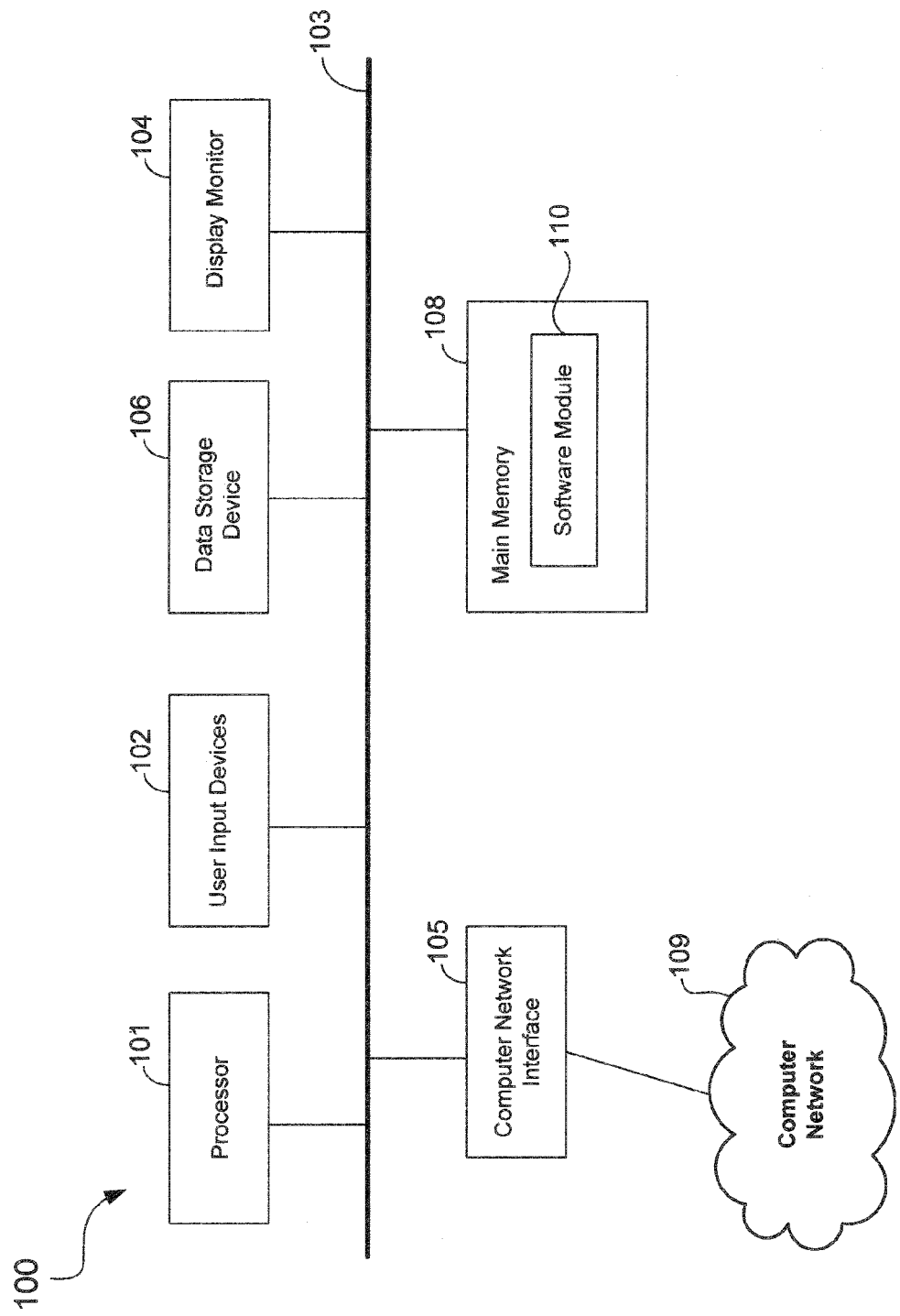
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as an antivirus support server computer or client computer, for example. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110, which may comprise computer-readable program components of an antivirus support server computer or client computer. The software modules 110 may be loaded from the data storage device 106 to the main memory 108 for execution by the processor 101.

Figure 2:
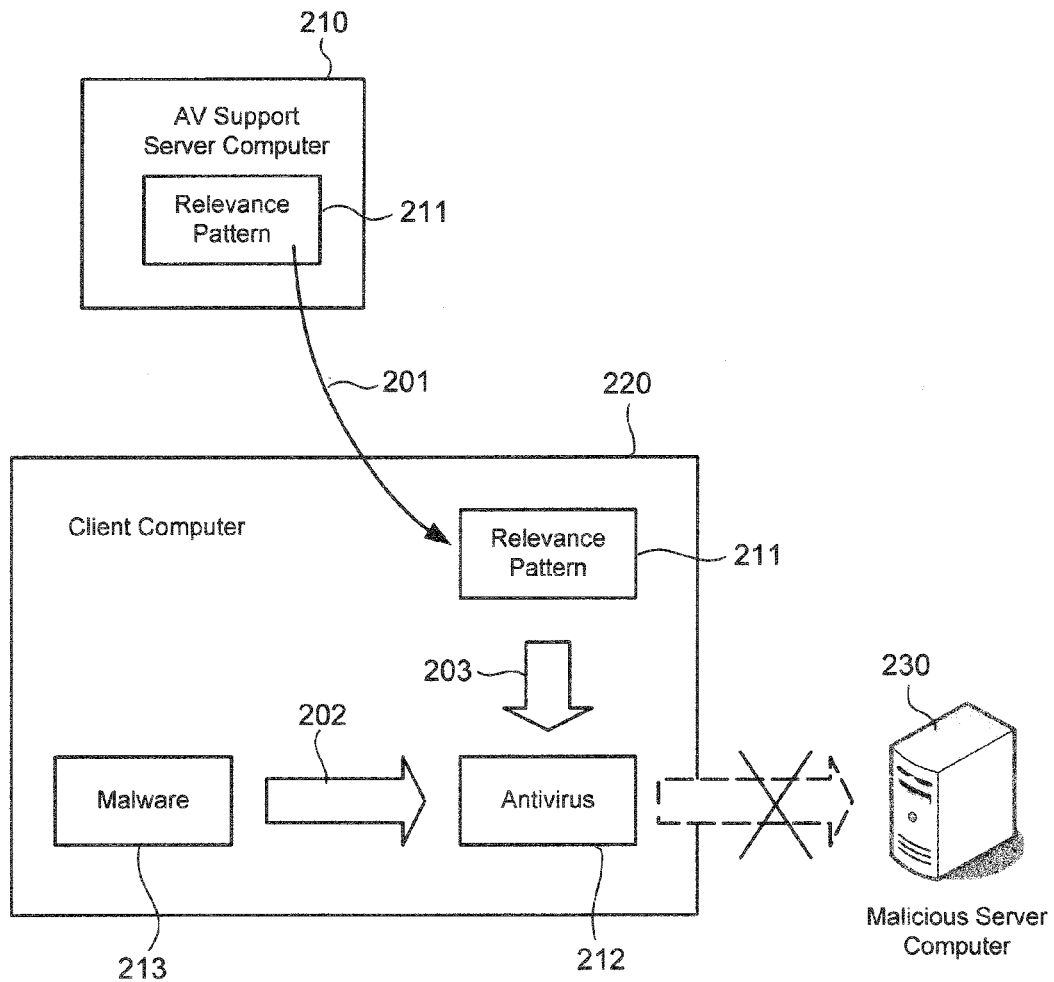
FIG. 2 schematically illustrates a method of detecting computer network data streams generated by a malware and its variants in accordance with an embodiment of the present invention.

FIG. 2 schematically illustrates a method of detecting computer network data streams generated by a malware and its variants in accordance with an embodiment of the present invention. In the example of FIG. 2, a relevance pattern 211 is available for download from an antivirus support server computer 210. The antivirus support server computer 210 may be configured to provide support, such as periodic updates, to an antivirus 212 resident and running in a client computer 220. The antivirus support server computer 210 may be maintained and operated by the vendor of the antivirus 212. The antivirus 212 downloads the relevance pattern 211 from the antivirus support server computer 210 to the client computer 220 (arrow 201).

The antivirus 212 may comprise computer-readable program code for detecting malware, including Trojan programs. Unfortunately, some Trojan programs are difficult to directly detect due to use of encryption, mutation, and other sophisticated detection evading techniques employed by malware creators. This renders file scanning techniques relatively ineffective against these Trojans. This is the case in the example of FIG. 2, where the antivirus 212 cannot readily detect that a malware 213 is present in the client computer 220. In the example of FIG. 2, the malware 213 comprises a Trojan program, such as the notorious CLAMPI (also known as "ILOMO") and ZEUS (also known as "ZBOT") malware.

A malware family comprises a malware and its variants. A variant is a mutation or variation of the malware. Unlike a traditional malware pattern, the relevance pattern 211 is a single pattern representing a malware and one or more variants in the same malware family. That is, the relevance pattern 211 is a highly targeted pattern for a family of related malware, not just a single variant of the malware family. In one embodiment, the relevance pattern 211 may be used to scan network data streams, as opposed to files, to detect the presence of the malware 213 in the client computer 220. The relevance pattern 211 may include a network fingerprint that is common across numerous variants of the malware in the same family. This advantageously allows for detection of continuously mutating and changing malware, not to mention reduction in the number of patterns needed to detect variants of a malware family. As can be appreciated, the antivirus 212 may employ several relevance patterns 211 to detect more than one malware family, or variants that have mutated to be very different from other members of the malware family. A single relevance pattern may be employted to detect a malware and one or more of its variants. Depending on the malware, a single relevance pattern may also be employed to detect an entire malware family.

In one embodiment, the relevance pattern 211 describes general indicators and behavior, such as network traffic characteristics, of the malware 213. For example, the relevance pattern 211 may indicate the network commands (e.g., HTTP commands), command parameters, headers (e.g., HTTP headers) used by the malware 213 to communicate with a malicious server computer 230. The relevance pattern 211 may also indicate the order in which the malware 213 issues these commands. A particular embodiment of the relevance pattern 211 is labeled in FIG. 6 as "211A" and in FIG. 7 as "211B."

In the example of FIG. 2, the malware 213 comprises a Trojan that is configured to steal confidential information, such as online banking information, from the client computer 220 and forward the confidential information to the malicious server computer 230. The antivirus 212 is configured to monitor network communication in and out of the client computer 220. In the example of FIG. 2, the antivirus 212 detects a computer network data stream (arrow 202) from the malware 213 to the malicious server computer 230. The antivirus 212 scans the network data stream for behavior (e.g., network traffic characteristics) and malware indicators indicated in the relevance pattern 211 (arrow 203). In this example, the network data stream from the malware 213 matches network traffic characteristics indicated in the relevance pattern 211.

Accordingly, the antivirus 212 blocks the network communication from the malware 213 to prevent the malware 213 from communicating with the malicious server computer 230. The antivirus 212 may also initiate other response actions, including alerting the user or administrator of the client computer 220, trace back the network data stream to the malware 213, and so on.

Figure 3:
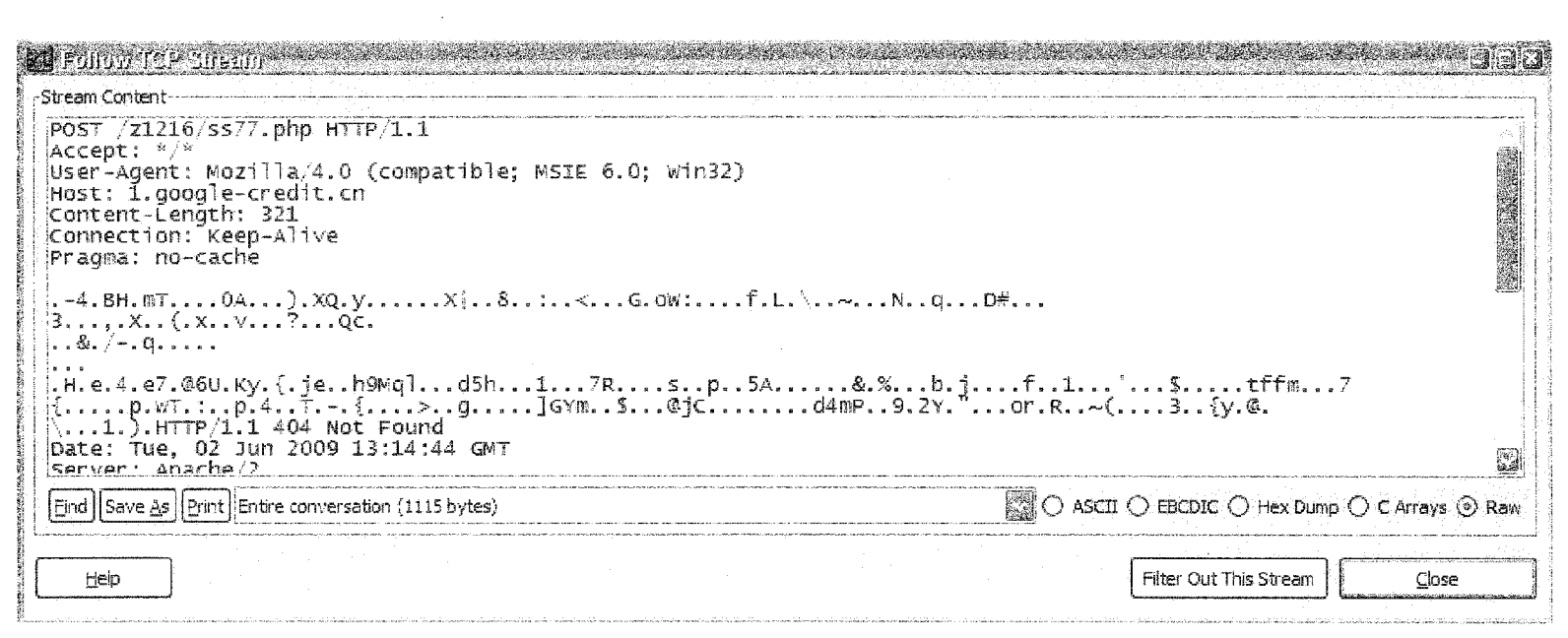
Figure 4:
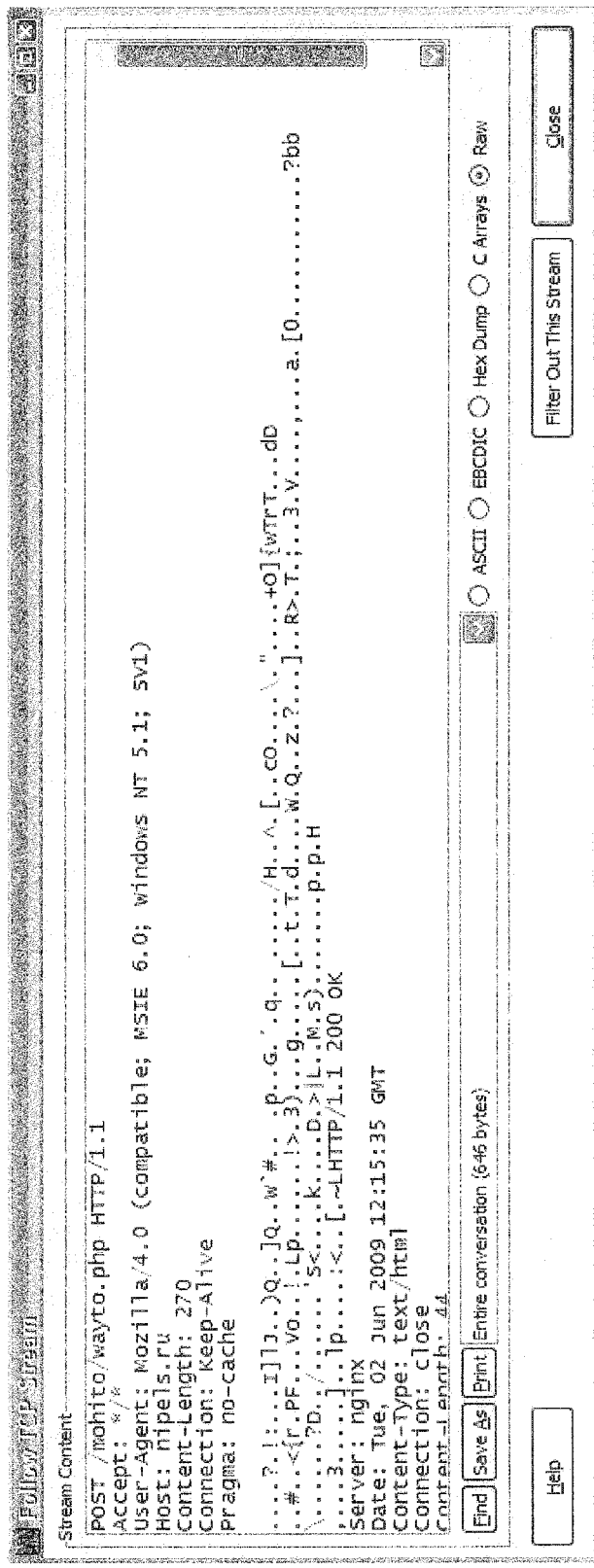
Figure 5:
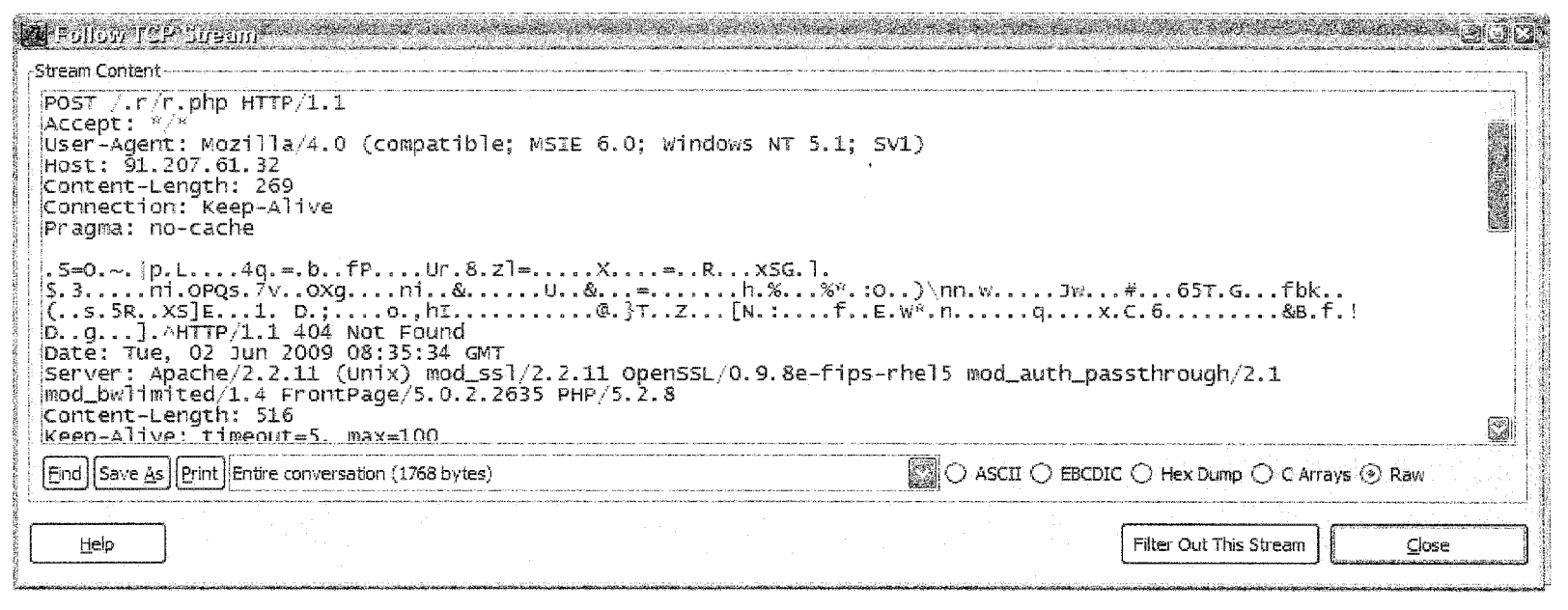

FIGS. 3-6 schematically illustrate generation of a relevance pattern 211A in accordance with an embodiment of the present invention. The relevance pattern 211A is a particular embodiment of the relevance pattern 211 of FIG. 2. The example of FIGS. 3-6 show screen shots of the Wireshark network protocol analyzer following a TCP (Transmission Control Protocol) stream. The TCP stream is the computer network data stream from a Trojan program (e.g., ZEUS malware). FIGS. 3-5 show the TCP stream from different variants of the Trojan. FIG. 3 shows the TCP stream from one variant, FIG. 4 shows the TCP stream from another variant, and FIG. 5 shows the TCP stream from yet another variant. Note that the variants of the Trojan communicate with different malicious server computers and have different binary data. Blackisting the malicious server computers in this case is relatively inefficient because of the number of malicious server computers continually increase and their URLs and URIs are easily changed.

Figure 6:
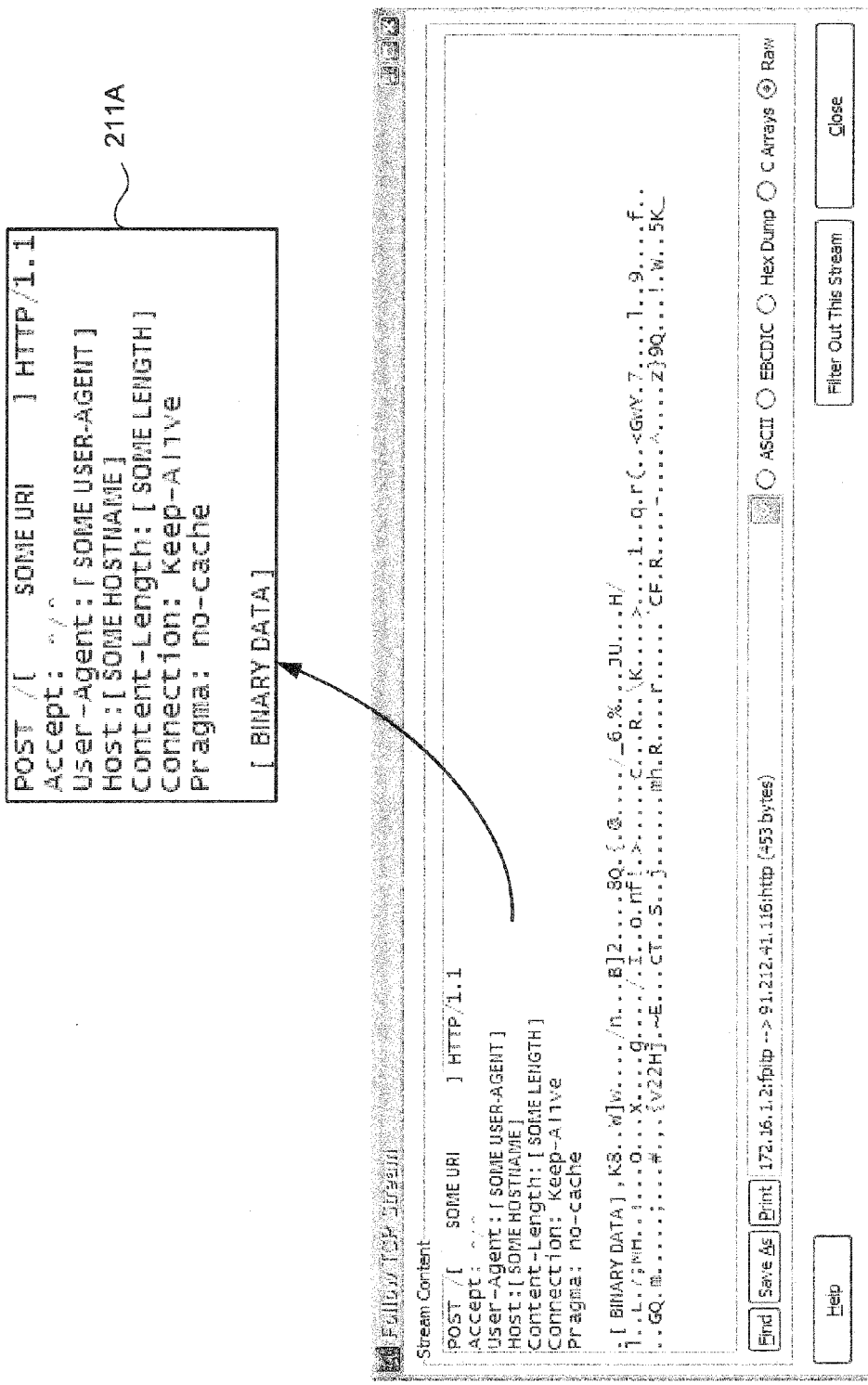

The inventors discovered that although the variants of a Trojan may change, the Trojan's behavior does not change because the behavior is hard coded into the Trojan. This is illustrated in FIG. 6, where the relevance pattern 211A indicates the common order in which the HTTP (Hypertext Transfer Protocol) command (see "POST") and headers ("Accept", "User-Agent", "Host", "Content-Length", "Connection", "Pragma") appear in the TCP stream of the different variants shown in FIGS. 3-5. The relevance pattern 211A also shows that binary data follow the "Pragma" header. Although the different variants may send different and/or encrypted binary data, or use different parameters (e.g., different URIs following the Post command), all of these variants commonly use the same sequential order in sending out the commands and headers. A single relevance pattern 211A may thus be used to scan computer network data streams to detect network communications by a Trojan and one or more of its variants, even when the variants have different URLs.

FIG. 6 illustrates the similarities and differences between the different variants of the Trojan. The differences between the variants are replaced with "[ ]", such as "[SOME URI]" indicating that the URIs differ between the variants. As explained above, the Trojan's network traffic characteristics, e.g., the order in which the Trojan sends commands and headers to its malicious server, remain the same across the different variants. Other network traffic characteristics that may be common across different variants of a Trojan family include whether or not the network data stream include binary data, size of the binary data, and content-length. Machine learning algorithms may be employed to detect the common behavior or network traffic characteristics of different variants of a Trojan. The relevance pattern may be optimized by providing the machine learning model a more controlled set of sample computer network data streams.

Figure 7:
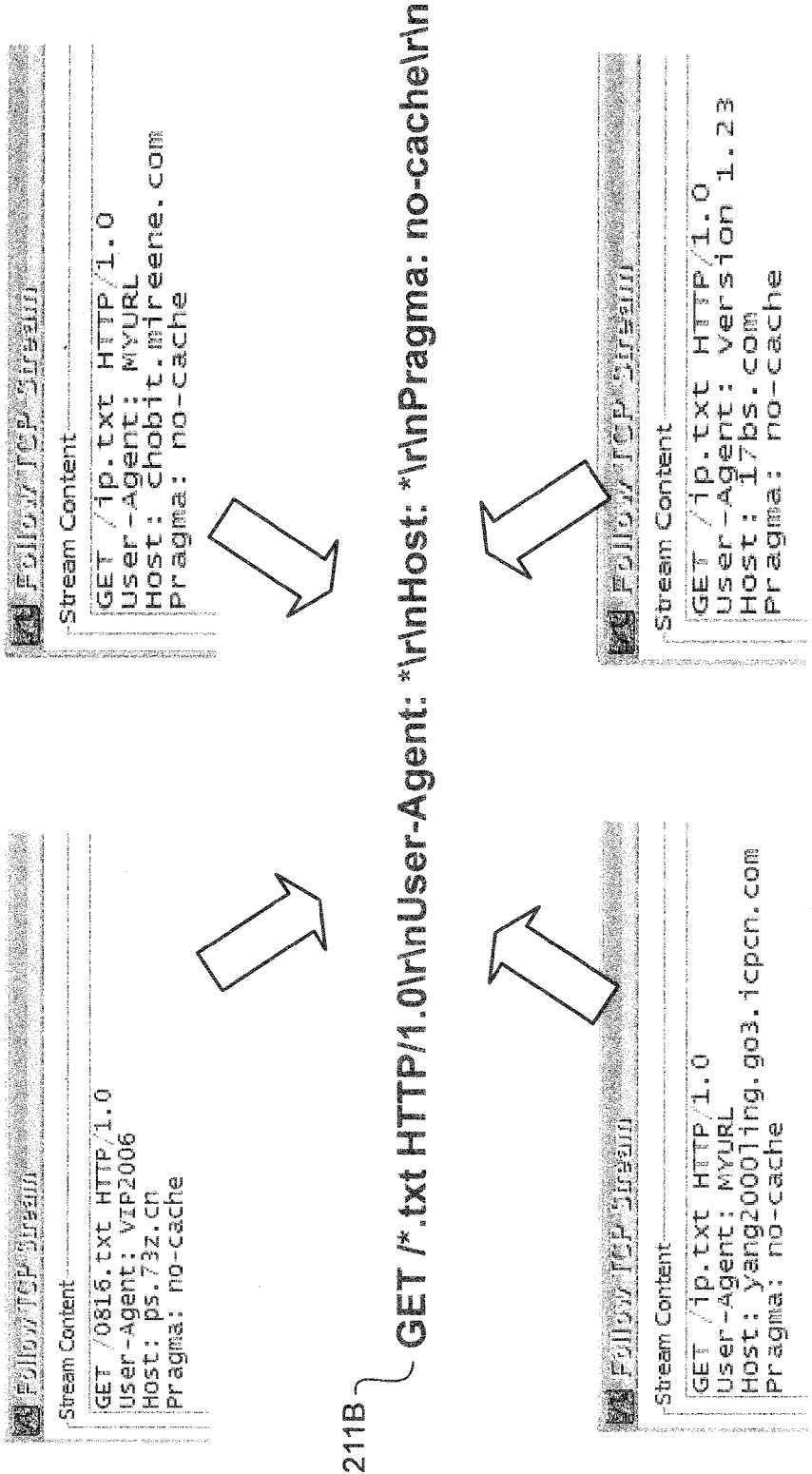
FIG. 7 shows a relevance pattern 201 generated for four different variants of a Trojan program, in accordance with an embodiment of the present invention.

FIG. 7 shows a relevance pattern 211B generated for four different variants of a Trojan program, in accordance with an embodiment of the present invention. The relevance pattern 211B is a particular embodiment of the relevance pattern 211. In the example of FIG. 7, the relevance pattern 211B represents the different variants of the same Trojan as a single regular expression where the character "*" represents a wildcard. Note how the order of the commands and headers in the TCP stream is preserved in the relevance pattern 211B. This advantageously allows for detection of the Trojan's computer network data streams even when the variants have different binary data, malicious server computer URL, and other easily changed characteristic.

Techniques for detecting computer network data streams from malware families have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting computer network data streams generated by a malware, the method comprising:
receiving a relevance pattern in a client computer, the relevance pattern indicating computer network traffic characteristics of a Trojan program and one or more variants of the Trojan program;
detecting a computer network data stream in the client computer;
determining whether the computer network data stream matches computer network traffic characteristics of the Trojan program or the one or more of the variants of the Trojan program indicated in the relevance pattern; and
preventing the Trojan program from communicating with the malicious server computer when the computer network data stream matches the network traffic characteristics of the Trojan program or the one or more of variants of the Trojan program indicated in the relevance pattern.

2. The method of claim 1 wherein the computer network traffic characteristics include an order HTTP (Hypertext Transfer Protocol) headers appear in the computer network data stream.

3. The method of claim 1 wherein the computer network traffic characteristics include an order in which HTTP commands and headers appear in the computer network data stream.

4. The method of claim 1 wherein the computer network data stream comprises a TCP (Transmission Control Protocol) stream.

5. The method of claim 1 wherein the relevance pattern comprises a regular expression describing an order that HTTP headers appear in the computer network data stream.

6. The method of claim 1 wherein the relevance pattern comprises characteristics that are common across the variants of the Trojan program.

7. The method of claim 6 wherein the characteristics include presence of binary data in the computer network data stream.

8. The method of claim 7 wherein the characteristics include size of the binary data.

9. The method of claim 6 wherein the characteristics include content-length.

10. The method of claim 1 wherein the variants of the Trojan program have different malicious server URL (uniform resource locator).

11. A method of detecting computer network data streams generated by a malware, the method comprising:
receiving a single relevance pattern in a client computer, the single relevance pattern indicating computer network traffic characteristics of a Trojan program and one or more variants of the Trojan program; and
detecting a TCP (transport control protocol) stream from a Trojan program running in the client computer, the TCP stream being sent by the Trojan program to a corresponding malicious server computer configured to receive confidential information stolen by the Trojan program in the client computer, the TCP stream being detected as being generated by the Trojan program based on an order that HTTP (Hypertext Transfer Protocol) commands and headers appear in the TCP stream.

12. The method of claim 11 wherein the single relevance pattern is configured to detect the variants of the Trojan program that have different malicious server computer URL (uniform resource locator).

13. The method of claim 11 wherein the single relevance pattern is configured to detect variants of the Trojan program that have different binary data.

14. The method of claim 11 wherein the HTTP commands include a POST command.

15. The method of claim 11 wherein the HTTP headers include a Host header.

16. A method of detecting computer network data streams generated by a malware, the method comprising:
receiving a relevance pattern in a client computer, the relevance pattern indicating computer network traffic characteristics of a Trojan program and one or more variants of the Trojan program, the Trojan program and the one or more variants of the Trojan program having different malicious server URL (uniform resource locator) and different binary data;

detecting a TCP (transport control protocol) stream generated by a variant of the Trojan program based on an order HTTP (hypertext transport protocol) commands appear in the TCP stream; and preventing the Trojan program from communicating with the malicious server computer in response to detecting the TCP stream generated by the variant of the Trojan program.

17. The method of claim 16 wherein the HTTP commands include a POST command.

18. The method of claim 16 wherein the TCP (transport control protocol) stream is detected to be generated by the variant of the Trojan program based on an order HTTP headers appear in the TCP stream.

19. The method of claim 16 wherein the HTTP headers include a Host header.

20. The method of claim 16 wherein the computer network characteristics include size of the binary data.

\* \* \* \* \*